April 4, 1950     H. L. GROSS     2,502,944
FISHING KITE
Filed Oct. 5, 1948
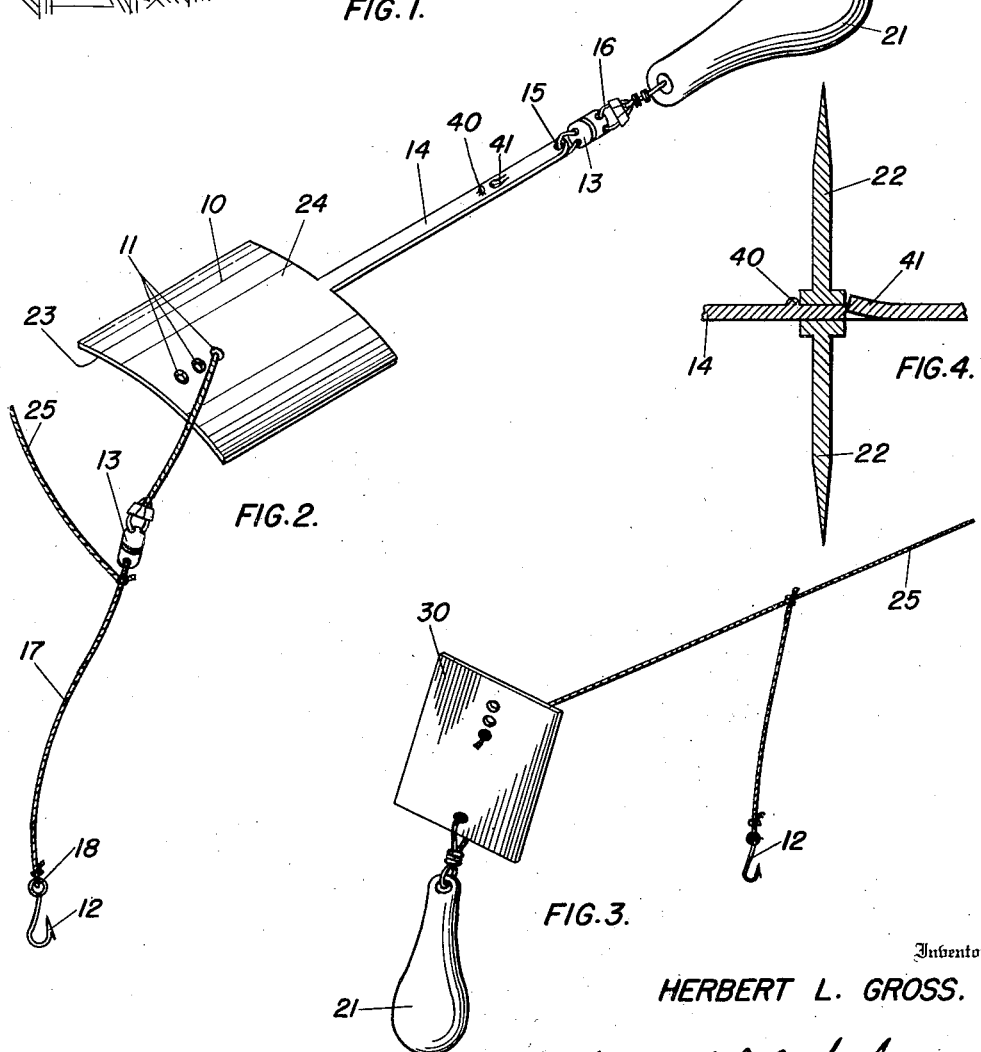
Inventor
HERBERT L. GROSS.
By Howard J. Whelan.
Attorney Patented Apr. 4, 1950

2,502,944

UNITED STATES PATENT OFFICE 2,502,944

FISHING KITE

Herbert L. Gross, Parkton, Md.

Application October 5, 1948, Serial No. 52,809

6 Claims. (Cl. 43—43.13)

This invention relates to fishing tackle or gear and more particularly to a depth kite for underwater operation of a casting fishing hook and line purposes.

It has among its objects to provide a new and improved depth kite for casting fishing lines that will avoid one or more of the disadvantages and limitations of the prior art.

Another object of the invention is to provide a new and improved depth kite or a fishing tackle that will effectively control the movement of the line and hook during still fishing and facilitate the detachment of the tackle from rocks or other obstructions.

A further object of the present invention is to provide a new and improved depth kite that will facilitate the removal of the sinker and the raising of the fish from the ground under water during fishing by diverting water in which it is being used to the underside direction of the kite.

An additional object of the herein described invention is to provide a new and improved fishing tackle that will have a kite so arranged that it will tend to resist the resistive movements of a fighting fish while at the same time facilitate the fisherman in getting it to the surface where he can adequately handle it.

Other objects will become apparent as the invention is more fully described.

This form of depth kite, used particularly in still fishing, distinguishes from other types and kinds in that it tends to lift an active fish to the surface from the ground or under level of water by diverting the water under it. Ordinarily the sinker on the tackle carries the kite down to the lower levels of the water after being cast in. It pulls down on the kite and grounds it flat but a fish caught on its leader and hook tilts it at an angle that causes the water to flow against the kite with force that varies with the amount of the angle induced in the kite by the pull of the fish. In this manner the kite keeps the sinker in its more desirable position for fishing, and facilitates the raising of the sinker, the kite, hook, and fish caught, when the user is ready to do so. Various actions may be induced in the gear by varying the place of attachment to the kite.

Other conventional forms of kites serve mainly to level off the fishing tackle as it is pulled through the water without inducing the undercurrent and lifting action used in this invention. They do not help the fisherman to untangle his gear or tackle from rocks, etc. as applicant's device does. He does this by pulling on the kite so it takes an angular position in the water of about 30°.

For a better understanding of the invention, and the objects thereof reference is made to the appended drawings, that indicate a preferred form of the invention. The following description in conjunction with the drawings enable the features of the invention and the principles on which it operates to be appreciated. The claims emphasize the scope of the invention.

Referring to the various figures in the drawings:

Figure 1 is a side elevation of a fishing line embodying this invention,

Figure 2 is an enlarged view similar to Figure 1, with the anchor prongs removed, and with the line, hook and sinker secured at different points, Figure 3 is a modified form of kite, and Figure 4 is an enlarged typical section taken through the anchor and spindle.

In the particular construction shown, a depth kite for still fishing comprises a plate 10 of thin material bent on each side of its longitudinal axis into arcuate form of slight angular contour. It is preferably rectangular and along its axis has a series of aligned holes 11 perforating it, for adjustably attaching a suitable flexible leader 17 which has a loop 18 for attaching a fishing hook 12 to it as shown in Figure 1. The attachment is preferably made off the center through the use of a detachable swivel safety-pin member 13. At the opposite side and aligned with the same axis extends a flat narrow spindle 14, which is a little longer than the kite plate 10. The spindle 14 is provided with a hole 15 and is preferably integral with the plate 10. Its hole 15 allows a detachable swivel safety-pin element 16 to be attached therein in one instance. The main fishing line 25 is attached to the leader 17 adjacent to the swivel 13. The element 16 is provided with a loop 19 at the opposite end and through a link 32 ties on to the eye 20 of a conventional lead sinker 21. The sinker is comparatively light. The element 16 while short, allows free movement of the sinker 21 on it in all directions. The spindle 14 is also provided with an anchor removably coupled to it, that consists of prongs 22 extending out from it, at right angles to the general plane of the plate 10. These prongs are desirable when sand is encountered. The underneath surface 23 of the plate 10 is concaved, while the upper surface 24 is convex. With the fishing hook 12, secured to the leader 17, as shown in Figure 1, and with one of the prongs 22 secured into the ground, the kite 10 is temporarily inoperative. When a fish bites the bait on hook 12, the pull is transmitted to the line 25 but since the prong acts as a brake the line will remain slack. If, however, the fisherman pulls on the line, he can free the prong and, therefore, play the fish. From this moment on, the prong is inoperative and the kite 10 comes into play. If the fish continues pulling and the fisherman does not pull on the line 25, the tendency is for the device to come up to the surface and to act as a brake on the fish while doing so. Since the kite has a curved surface, the normal tendency is for the kite to come up with its convex side facing downwardly and it always rights itself to this position in order to offer the least resistance to the stream pressure. If, instead of the fish pulling on the hook, the fisherman does the pulling on line 25, the same thing as described above will happen, i. e., the kite will come up with its convex side facing downwardly. In Figure 2 the prongs 22 are removed, the sinker is attached to the spindle 14, the hook 12 is selectively secured to one of a series of openings 11 aligned along the longitudinal axis of the kite 10 and the line 25 is connected between the hook and the kite. With no pull exerted on the fishing line or hook line the kite will lie on the ground beneath the water in a relatively flat position. Now, when a fish bites or when the fisherman pulls on the line 25, or in simultaneous occurrence of both events, the kite 10 will ascend to the surface with its convex side downwards, acting as a brake, both on the pull of the fish and on that of the fisherman, as explained heretofore. The novelty or new result secured through the use of the kite lies in the multiplicity of the openings 11, any one of which may be used. It will be realized that as the kite moves upwardly, the portion thereof situated beneath the opening to which the line and hook are secured will act as a lifting area while the portion thereof situated above the opening will act both as a lifting and a braking area. Therefore, the higher up the line attachment moves on the kite, and this would be to the right in Figure 1 and to the left in Figure 2, the more lifting and the less braking action will result. Consequently, the fisherman may select such opening 11 as to obtain the result he desires, thus varying the action of the kite and its retarding effect both on his own pull on the line 25 and on the pull of the fish biting on the hook 12.

In the modified form shown in Figure 3, the kite 30 consists of a flat plate, the sinker 21 is attached to one end thereof, the line 21 is passed through one of the selective openings as the openings 11 heretofore mentioned, and the hook 12 is attached to the line 25 forward of the plate as shown. The same operation of plate 30 applies as was described in connection with arcuate kite 10.

The curved kite is particularly effective, as its arcuate form tends to retain it in the horizontal position that it assumes on being trolled. It is economical in form, and light in structure. The sinker being positioned at the end of the spindle, some distance in front of the plate, eliminates from the latter a jumpy or erratic action in the water. The anchor prongs not only serve the purpose already referred to, but tend to act as a rudder to the kite. This controls the movement of the kite so as to keep it on a straight course. The anchor 22 is slid on the spindle 14 until it reaches the stop 40 at which point a finger 41 preferably stamped from the spindle 14 projects outwardly against the anchor 22 and holds it in place. To remove the anchor 22, the finger 41 is depressed and the anchor is slid off the spindle.

While but two general forms of the invention are shown in the drawings and described in the specifications, it is not desired to limit this application for patent to these particular forms any other way otherwise than limited by the scope thereof, as it is appreciated that other forms could be made that would use the same principles and come within the scope of the appended claims.

Having thus described the invention, what is claimed is:

1. In combination with a sinker for fishing tackle, a kite comprising a plate having perforations along its axis for the adjustable attachment of a fishing line and hook thereto, said sinker being flexibly attached to the plate at a point opposite to that of said hook, whereby the plate will offer resistance to being pulled through the water by being tilted in the water against such pull.

2. In combination with a sinker for fishing tackle, a kite comprising a plate having perforations along its axis for the attachment of a fishing line and hook thereto, said sinker being flexibly attached to the plate at a point opposite to that of said hook, and a spindle projecting from the plate along the axis thereof for spacing said sinker from the plate so the sinker will be prevented from striking the plate with its body portion, and the plate may be hinged on said sinker to tilt against the water when a fish pulls on said hook.

3. In combination with a sinker for fishing tackle, a kite comprising a plate having perforations along its axis for the variable attachment of a fishing line and hook thereto, said sinker being flexibly attached to the plate at a point spaced from to that of said hook, a spindle projecting from the plate along the axis for spacing said sinker from the plate so it will be prevented from striking the plate with its body portion, and an anchor including prongs extending outwardly from the spindle for facilitating the guiding and holding of the kite in position.

4. In combination with a sinker for fishing tackle, a kite comprising a plate having perforations along its axis for the adjustable attachment of a fishing line and hook thereto, said sinker being flexibly attached to the plate at a point opposite to that of said hook, a spindle projecting from the plate along the axis for holding and spacing said sinker from the plate so it will permit angular positioning in regard thereto, an anchor including prongs extending outwardly from the spindle for facilitating the guiding and holding of the kite in position, said plate being bent symmetrically about its axis to vary its action with the angularity thereof relative to the line of pull.

5. In combination with a sinker for fishing tackle, a kite comprising a plate having a perforation along its axis for the attachment of a fishing line thereto, said sinker being flexibly attached to the plate at a point opposite to that of said line, a spindle projecting from the plate along the axis for spacing said sinker from the plate and affording to fulcrum therefor at said sinker on which to hinge, an anchor including prongs extending outwardly from the spindle for facilitating the guiding and holding of the kite in position, said plate being formed symmetrically about its axis to vary its action with the angularity thereof relative to the line of pull, and means for flexibly joining the plate, to said line at the point of attachment and the anchor to said spindle, said plate being induced to take an angular position resistive to its travel in the water when a pull is induced in the line.

6. In combination with a sinker for fishing tackle, a kite comprising a plate having perforations along its axis for the attachment of a fishing line thereto, said sinker being flexibly attached to the plate at a predetermined point, an integral spindle projecting from the plate along the axis for spacing said sinker from the plate so it will not control the position of same, an anchor including prongs extending outwardly from the spindle for facilitating the guiding and holding of the kite in position, said plate being formed symmetrically about its axis to facilitate its movement through the water during fishing, means for flexibly joining the plate, to said line at the point of attachment and the sinker to said spindle, said anchor being arranged on said spindle at a point adjacent to the end thereof, and the sinker being so attached to the spindle as to permit a hinged movement thereof.

HERBERT L. GROSS.

REFERENCES CITED

The following references are of record in the file of this patent:

UNITED STATES PATENTS

| Number | Name | Date |
| --- | --- | --- |
| 1,297,617 | Welles | Mar. 18, 1919 |
| 2,037,232 | Hendriks | Apr. 14, 1936 |
| 2,220,302 | Thorne | Nov. 5, 1940 |
| 2,234,943 | Nyman | Mar. 11, 1941 |
| 2,247,583 | Louthan | July 1, 1941 |
| 2,294,081 | Fairfax | Aug. 25, 1942 |